United States Patent
Huggehalli et al.

(10) Patent No.: US 12,238,634 B2
(45) Date of Patent: Feb. 25, 2025

(54) APPLYING RULES FOR ROUTING OUTGOING TRAFFIC AT A USER DEVICE

(71) Applicant: GOOGLE LLC, Mountain View, CA (US)

(72) Inventors: Pavan Huggehalli, Mountain View, CA (US); Jibing Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 373 days.

(21) Appl. No.: 17/774,332

(22) PCT Filed: Nov. 6, 2020

(86) PCT No.: PCT/US2020/059309
§ 371 (c)(1),
(2) Date: May 4, 2022

(87) PCT Pub. No.: WO2021/092308
PCT Pub. Date: May 14, 2021

(65) Prior Publication Data
US 2022/0408345 A1    Dec. 22, 2022

Related U.S. Application Data

(60) Provisional application No. 62/932,412, filed on Nov. 7, 2019.

(51) Int. Cl.
| | | |
|---|---|---|
| H04W 8/12 | (2009.01) |
| H04L 12/24 | (2006.01) |
| H04W 40/28 | (2009.01) |
| H04W 40/34 | (2009.01) |

(52) U.S. Cl.
CPC .......... *H04W 40/28* (2013.01); *H04W 40/34* (2013.01)

(58) Field of Classification Search
None
See application file for complete search history.

(56) References Cited

U.S. PATENT DOCUMENTS

| | | | | |
|---|---|---|---|---|
| 10,602,422 | B1 * | 3/2020 | Jagannatha | H04L 41/5041 |
| 11,496,944 | B2 * | 11/2022 | Huang-Fu | H04W 40/02 |
| 11,750,408 | B2 * | 9/2023 | Tang | H04L 69/327 370/230 |
| 11,849,331 | B2 * | 12/2023 | Lee | H04W 12/69 |
| 12,069,556 | B2 * | 8/2024 | Xu | H04W 40/248 |
| 2018/0278534 | A1 | 9/2018 | Giaretta et al. | |
| 2019/0394279 | A1 | 12/2019 | Dao et al. | |

(Continued)

OTHER PUBLICATIONS

International Search Report and Written Opinion for Application No. PCT/US2020/059309, dated Feb. 3, 2021.

(Continued)

*Primary Examiner* — Sithu Ko
(74) *Attorney, Agent, or Firm* — Womble Bond Dickinson (US) LLP

(57) ABSTRACT

Processing hardware in a user equipment (UE) that communicates with a core network (CN) via a radio access network (RAN) can implement a method of routing outgoing traffic from the UE. The method includes determining a proscribed traffic descriptor which the UE is to match to rules defined by the CN that specify route selection for outgoing traffic (602). The method further includes preventing use of the traffic descriptor for application of a rule specifying route selection to the outgoing traffic (606).

20 Claims, 8 Drawing Sheets

(56) References Cited

U.S. PATENT DOCUMENTS

| | | | |
|---|---|---|---|
| 2020/0053622 A1 | 2/2020 | Huang-Fu et al. | |
| 2020/0187085 A1* | 6/2020 | Jagannatha | H04L 41/0893 |
| 2020/0412559 A1* | 12/2020 | Tang | H04L 47/824 |
| 2020/0413244 A1* | 12/2020 | Park | H04W 60/06 |
| 2021/0211938 A1* | 7/2021 | Shen | H04W 40/34 |
| 2021/0329541 A1* | 10/2021 | Salkintzis | H04W 48/18 |
| 2022/0104117 A1* | 3/2022 | Xu | H04W 48/18 |
| 2022/0272620 A1* | 8/2022 | Ninglekhu | H04W 48/18 |

OTHER PUBLICATIONS

OPPO, "Clarification on UE Capability to Support URSP," 3GPP Draft (2018).

"3rd Generation Partnership Project; Technical Specification Group Core Network and Terminals; User Equipment (UE) Policies for 5G System (5GS); Stage 3 (Release 16)," 3GPP Draft 2019.

"5G; 5G System; Access and Mobility Policy Control Service; Stage 3," 3GPP TS 29.507 V15.0.0.

"3rd Generation Partnership Project; Technical Specification Group Services and System Aspects; System Architecture for the 5G System (5GS); Stage 2 (Release 16)," 3GPP TS 23.501 V16.2.0, pp. 96-206.

"3rd Generation Partnership Project; Technical Specification Group Services and System Aspects; Policy and Charging Control Framework for the 5G System (5GS); Stage 2 (Release 16)," 3GPP TS 23.503 V16.2.0.

"3rd Generation Partnership Project; Technical Specification Group Core Network and Terminals; User Equipment (UE) policies for 5G System (5GS); Stage 3 (Release 16)," 3GPP TS 24.526 V16.1.0.

* cited by examiner

APPLYING RULES FOR ROUTING OUTGOING TRAFFIC AT A USER DEVICE

FIELD OF THE DISCLOSURE

This disclosure relates generally to wireless communications and, more particularly, to applying rules for routing outgoing traffic at a user device.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In fifth-generation (5G) wireless communication systems, a user equipment (UE) can apply a so-called UE Route Selection Policy (URSP) to outgoing traffic to determine how the UE should route traffic for a certain application executing on an operating system (OS), a certain domain, a certain network host, etc. As defined by the current 5G standards, an URSP rule includes (1) a rule precedence value, (2) one or more traffic descriptors, and (3) one or more route selection descriptors. Rule precedence values determine the order in which the UE applies the URSP rules, traffic descriptors specify how the UE should match outgoing traffic to the rule to determine whether the rule applies, and route selection descriptors specify how the UE should route the traffic if the rule applies.

For example, according to a first URSP rule, a UE should route traffic related to network domain D to the already-established Protocol Data Unit (PDU) session; according to a second USRP rule, the UE should establish a new PDU session for outgoing traffic addressed to host H; and according to a third URSP rule, the UE should offload all Ethernet traffic to a wireless local area network (WLAN) such as a WiFi® network. If the first rule in this example has a higher rule precedence value than the second rule, the UE should apply the first rule rather than the second rule to the outgoing traffic that matches the respective traffic descriptors of the first and second rules (i.e., the traffic relates to domain D and is addressed to host H).

A UE can locally store pre-provisioned URSP rules and also receive URSP rules from the core network (CN). According to the current 5G standards, when the UE has both pre-provisioned rules and CN-specified rules, the UE applies the CN-specified rules.

Generally speaking, URSP techniques provide significant flexibility to the CN. However, the existing techniques also require that UEs support multiple types of traffic descriptors to execute the corresponding URSP rules. This is difficult in some cases because a UE may not always have access to all of the traffic parameters of outgoing traffic. For example, if different vendors implement different components of the UE, the entity executing the URSP may be unable to determine the traffic parameters for all the applications and services relying on data connectivity at the UE. As a result, the UE cannot always match outgoing traffic to an URSP rule, and therefore may fail to apply a URSP rule that would have been applicable had all the traffic parameters been known by the UE.

SUMMARY

A UE of this disclosure can prevent the use of certain traffic descriptors in rules that specify route selection at the UE, such as rules that make up an URSP or another suitable policy. The UE can identify certain traffic descriptors as being proscribed, or not available for application at the UE (e.g., because the entity executing the rules does not have access to the proscribed traffic descriptor). The UE can ignore the rule that includes a proscribed traffic descriptor, apply the rule based on a non-proscribed traffic descriptor, or prioritize a local configuration over the rule with the proscribed traffic descriptor, for example. In some implementations or scenarios, the UE can preemptively request that the CN not supply the UE with any rules that include the proscribed traffic descriptors. The UE also can combine some of these techniques.

An example embodiment of these techniques is a method of routing outgoing traffic in a UE that communicates with a core network CN via a radio access network (RAN). The method is implemented by processing hardware and includes determining a proscribed traffic descriptor which the UE is to match to rules defined by the CN that specify route selection for outgoing traffic. The method further includes preventing use of the traffic descriptor for application of a rule specifying route selection to the outgoing traffic.

Another example embodiment of these techniques is a UE including processing hardware and configured to execute the method above.

Yet another example embodiment of these techniques is a method in a core network for facilitating routing of outgoing traffic at a UE. The method is implemented by processing hardware and includes receiving an indication of a proscribed traffic descriptor which the UE is to match to rules defined by the CN that specify route selection for outgoing traffic, and preventing use of the traffic descriptor for application of a rule specifying route selection to the outgoing traffic at the UE.

Still another embodiment of these techniques is a core network including processing hardware and configured to execute the method above.

DETAILED DESCRIPTION OF THE DRAWINGS

Figure 1:
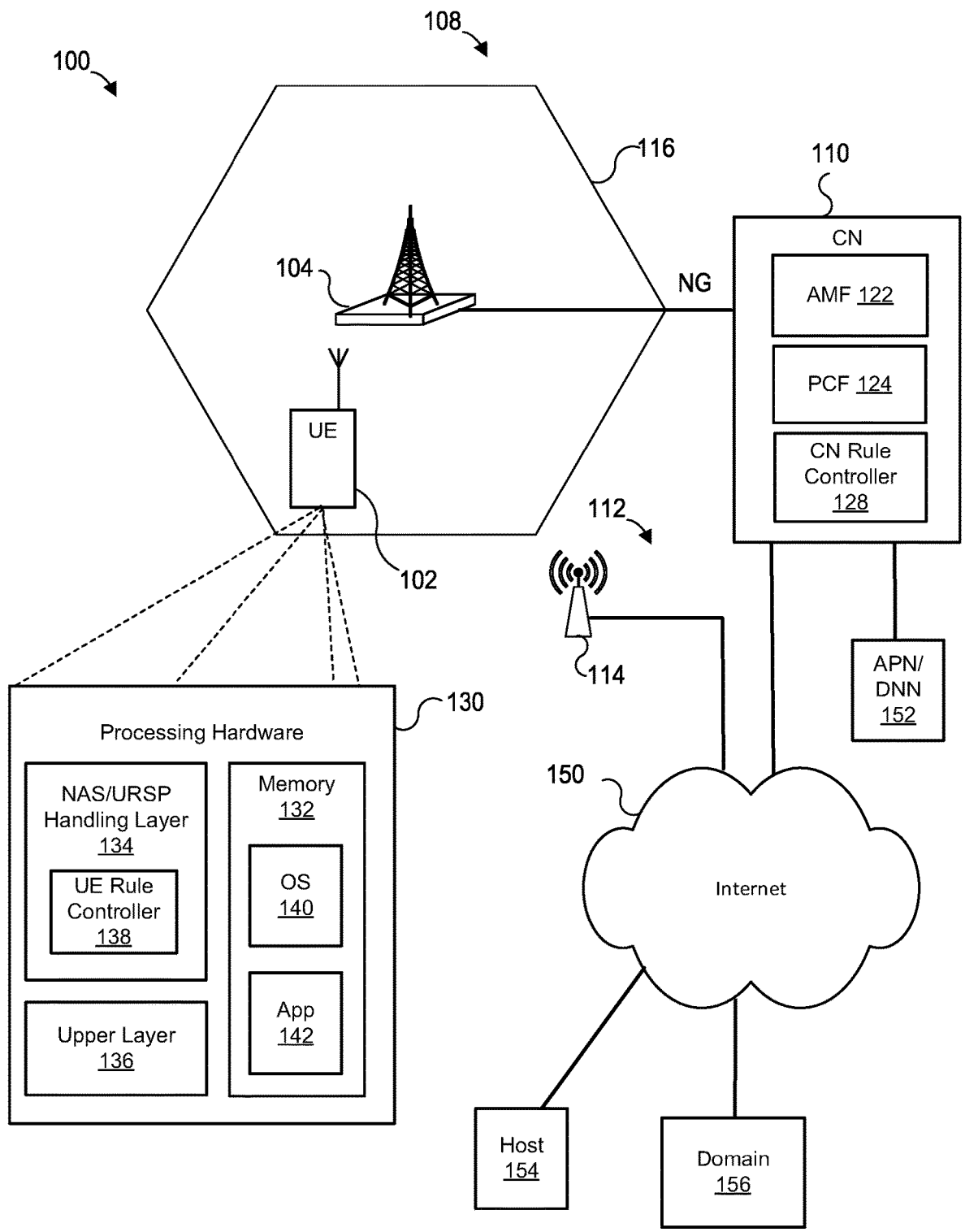
FIG. 1 illustrates an example communication system in which the routing techniques of this disclosure can be implemented.

FIG. 1 illustrates an example communication system 100 in which the routing techniques of this disclosure can be implemented. The communication system 100 includes a user equipment (UE) 102, which can be any suitable device capable of wireless communications with a core network (CN) 110 via a base station 104.

Generally speaking, the UE 102 can determine that certain traffic descriptors associated with rules that specify route selection for outgoing traffic at the UE 102 are proscribed (or "forbidden"), and that the UE 102 should not use these proscribed descriptors when matching the outgoing traffic to the rules. Although the disclosure refers primarily to URSP rules, these techniques also can apply to other rule-based routing mechanisms.

As discussed in more detail below, the UE 102 can determine that a rule includes a proscribed traffic descriptor and subsequently ignore the rule when applying the set of rules of an URSP. As another example, the UE 102 can determine that a rule contains both proscribed and non-proscribed, or permissible, traffic descriptors. The UE 102 then can apply the rule by ignoring the proscribed traffic descriptors and using only the permissible traffic descriptors for matching the outgoing traffic.

In another example implementation, the UE 102 is allowed to prioritize a local configuration over URSP rules received from the CN 110. For instance, the UE 102 can apply local rules over those rules that include proscribed traffic descriptors, or can prioritize a local set of rules in its entirety over the URSP rules received from the CN 110.

Still further, the UE 102 can preemptively request that the CN 110 not supply the UE 102 with any URSP rules that include the proscribed traffic descriptors. For example, the UE 102 can determine that a certain traffic descriptor is proscribed and transmit a corresponding indication to the CN 110. To this end, the UE 102 can use an existing protocol for managing URSP rules or use a dedicated message for indicating proscribed traffic descriptors.

The UE also can combine at least some of these techniques. For example, if the UE 102 sends an indication of a proscribed traffic descriptor to the CN 110, but the CN 110 nevertheless responds with URSP rules containing proscribed traffic descriptors (for example, due to a race condition or because the CN 110 does not support the message from the UE 102), the UE 102 can apply the other techniques discussed above to prevent application of any rules that contain forbidden traffic descriptors. As another example, the UE 102 can ignore rules that reference only proscribed traffic descriptors, but still apply rules that reference both proscribed and permissible traffic descriptors by utilizing only the permissible traffic descriptors. In at least some of the implementations, the UE 102 can consider the rules that reference one or more proscribed traffic descriptors as inapplicable.

As illustrated in FIG. 1, the base station 104 is communicatively connected to a core network (CN) 110 via an NG interface, for example. In some implementations, the base station 104 is a 5G New Radio (NR) base station operating as a g Node B (gNB), and the CN 110 is a 5G core network (5GC). In other implementations, however, the communication system 100 can include one or more base stations that operate according to radio access technologies (RATs) of types other than NR, and these base stations can be connected to CNs of other types. Further, the UE 102 also may have direct access via a radio interface to other types of access networks, such as a wireless local area network (WLAN) 112 (via an access point (AP) 114, for example).

The base station 104 is associated with a RAN 108 and provides coverage to a cell 116. While FIG. 1 depicts the base station 104 as associated with only one cell 116, it is understood that the base station 104 may also cover one or more additional cells not shown in FIG. 1. Further, the RAN 108 can include any suitable number of base stations that collectively support one or more RATs. The UE 102 can communicatively connect with the RAN 108 via base station 104 when operating within cell 116, and in turn can communicatively connect with the CN 110 via the RAN 108.

The UE 102 is equipped with processing hardware 130, which can include one or more general-purpose processors (e.g., CPUs) and at least one non-transitory computer-readable memory 132 storing instructions executable on the one or more general processors and/or special-purpose processing units. The memory 132 stores an operating system (OS) 140 of the UE 102, which can be any type of suitable mobile or general-purpose operating system. In addition, the memory 132 may also store one or more applications 142. In operation, the one or more applications 142 generate outgoing traffic and receive incoming traffic. These applications can include web browsers, mailing applications, messaging applications, video and audio players, gaming applications, etc.

To communicate with the base station 104, the CN 110, and various remote hosts, the UE 102 implements a communication protocol stack that includes an upper layer 136 and an NAS/URSP handling layer 134. The layers 134 and 136 can be implemented using any suitable combination of hardware, software, and firmware. In one example implementation, the layers 134 and 136 are a set of instructions that the processing hardware 130 executes to perform the rule application techniques discussed herein.

The upper layer 136 can identify outgoing traffic at the UE and provide outgoing traffic to the NAS/URSP handling layer 134 for routing. The NAS/URSP handling layer 134 can be a combined layer including both a NAS layer and a URSP handling layer. The NAS layer can manage the establishment and maintenance of communication sessions, such as protocol data unit (PDU) sessions. Further, the NAS layer can receive URSP rules from the CN and configure the URSP handling layer with the received URSP rules. The combined NAS/URSP handling layer 134 can manage the application of rules for routing outgoing traffic at the UE 102, as described in further detail below. When the upper layer 136 determines that an application 142 executing on the UE 102 has queued outgoing data for transmission, the upper layer 136 can direct the NAS/URSP handling layer 134 to apply one or more URSP rules and route the outgoing application traffic accordingly.

The NAS/URSP handling layer 134 in an example implementation includes a UE rule controller 138 configured to manage or control application of rules for routing outgoing traffic, and prevent application of proscribed traffic descriptors.

The CN 110 can be, for example, a 5G core network (5GC), a less advanced core network (e.g., an evolved packet core (EPC)) or, conversely, a more advanced core network. The CN 110 may be equipped with a mobility management entity such as Access and Mobility Management Function (AMF) 122 configured to manage authentication, registration, mobility, and other related functions, and a policy control entity such as Policy Control Function (PCF) 124 for providing policies for mobility and session management. The CN 110 also may include a CN rule controller 128 configured to manage, modify, and transmit to the UE 102 (and other UEs) various rules for routing outgoing traffic at the UE 102, such as a set of rules associated with an URSP. The CN rule controller 128 can operate as a separate entity or as a component of the PCF 124, depending on the implementation. In some scenarios, the PCF 124 provides to the UE 102 a policy in accordance with which the UE 102 should route outgoing traffic. This policy can be include a set of rules that conform to the URSP, discussed in more detail below with reference to FIG. 2.

With continued reference to FIG. 1, the CN 110 communicatively connects UE 102, via the RAN 108 including the base station 104 (and typically multiple other base stations), to various communication networks including a wide area network such as the Internet 150. More specifically, the CN 110 can directly connect to a data network via an access point name (APN) or data network name (DNN) gateway 152. The UE 102 can include outgoing traffic with a traffic descriptor that identifies the gateway 152, and the CN 110 can provide a rule that references the gateway 152. When the UE 102 determines that the traffic descriptor referencing the gateway 152 is permissible, the UE rule controller 138 applies the rule and routes the outgoing traffic in accordance with the rule. Otherwise, when the UE 102 determines that the traffic descriptor referencing the gateway 152 is proscribed, the UE rule controller 138 ignores the rule, modifies the rule, or otherwise processes the rule in accordance with the techniques of this disclosure. In other example scenarios, outgoing traffic and/or one or more rules can reference a domain 156, a particular host 154 (e.g., by host name or Internet Protocol (IP) address), type of traffic (e.g., Ethernet), etc.

Figure 2:
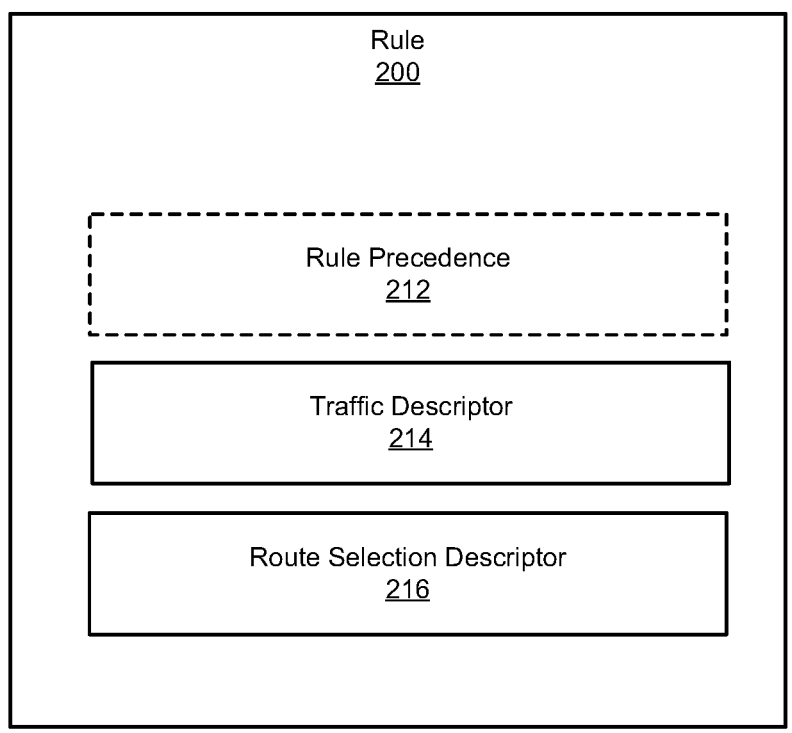
FIG. 2 is a block diagram of an example rule for route selection which the UE of FIG. 1 can apply to outgoing traffic.

FIG. 2 is a block diagram of an example rule 200 for route selection which the UE 102 of FIG. 1 can apply to outgoing traffic to determine how the UE 102 should route outgoing traffic. A route selection policy, such as a URSP received from CN 110 or a local configuration stored at the UE 102, includes one or more rules that conform to the format of FIG. 2. The example rule 200 includes a rule precedence 212, a traffic descriptor 214, and a route selection descriptor 216. In general, rules may include one or more traffic descriptors and one or more route selection descriptors.

The rule precedence field 212 specifies the order in which the UE 102 applies the rule 200 relative to other rules. In some implementations, the rule precedence 212 of each rule is different from the rule precedence of every other rule within the URSP. Traffic descriptors specify how the UE 102 should match outgoing traffic to the rule. For example, if the traffic descriptor 214 of rule 200 matches the parameters of outgoing traffic, then the UE 102 would apply rule 200 to the outgoing traffic. A URSP can include a rule with lowest precedence that has a "match all" traffic descriptor that UE 102 can apply to any outgoing traffic.

Traffic descriptors may include, for example, application identifiers of applications 142 executing on the OS 140 of the UE 102. As another example, traffic descriptors may also correspond to IP descriptors such as an IP destination and/or an IP 3 tuple including destination IP address or IPv6 network, port number, and protocol ID. Traffic descriptors may also be non-IP descriptors such as descriptors for Ethernet traffic. In some embodiments, a traffic descriptor may refer to a specific type of network traffic. Further, as discussed above, traffic descriptors may correspond to an APN or DNN gateway 152. Traffic descriptors also may correspond to various connection capabilities of the UE 102, such as IP Multimedia Subsystem (IMS) capabilities, Multimedia Message Service (MMS) capabilities, or other internet-related capabilities. Still further, traffic descriptors may be domain descriptors such as a domain name (e.g., of domain 156), a hostname (e.g., of host 154), or a fully qualified domain name (FQDN) made up of a domain name and a hostname.

The route selection descriptor 214 specifies how the UE 102 should route the traffic if the rule applies. For example, the route selection descriptor 216 may specify that the UE 102 should route traffic matching the traffic descriptor 214 of the rule 200 to an already-established communication session, such as an established Protocol Data Unit (PDU) session. As another example, the route selection descriptor 216 may instruct the UE 102 to establish a new PDU session for outgoing traffic matching the rule 200. As yet another example, the route selection descriptor 216 may instruct the UE 102 to offload outgoing traffic matching the rule 200 to a wireless local area network (WLAN) such as a WiFi® network.

In an example scenario, a URSP includes three rules. Rule $R_1$ may have a rule precedence of 1 and a traffic descriptor corresponding to application identifier $App_1$. Rule $R_2$ may have a rule precedence of 2 and traffic descriptor corresponding to application identifier $App_2$. Rule $R_3$ may have a rule precedence of 3 and traffic descriptor corresponding to the "match all" option. When the UE 102 has outgoing traffic, the UE 102 evaluates the rules in the order of rule precedence. Thus, the UE 102 in this scenario first determines whether it should apply rule $R_1$ to the outgoing traffic by determining whether the outgoing traffic matches the traffic descriptor of rule $R_1$, i.e., if the outgoing traffic corresponds to traffic of $App_1$. If the outgoing traffic corresponds to traffic of $App_1$, the UE 102 applies rule $R_1$ to the outgoing traffic and routes the traffic in accordance with the one or more route selection descriptors of rule $App_1$. If the outgoing traffic does not match the traffic descriptor of rule $R_1$, the UE 102 determines whether it should apply rule $R_2$, and so on.

Figure 3A:
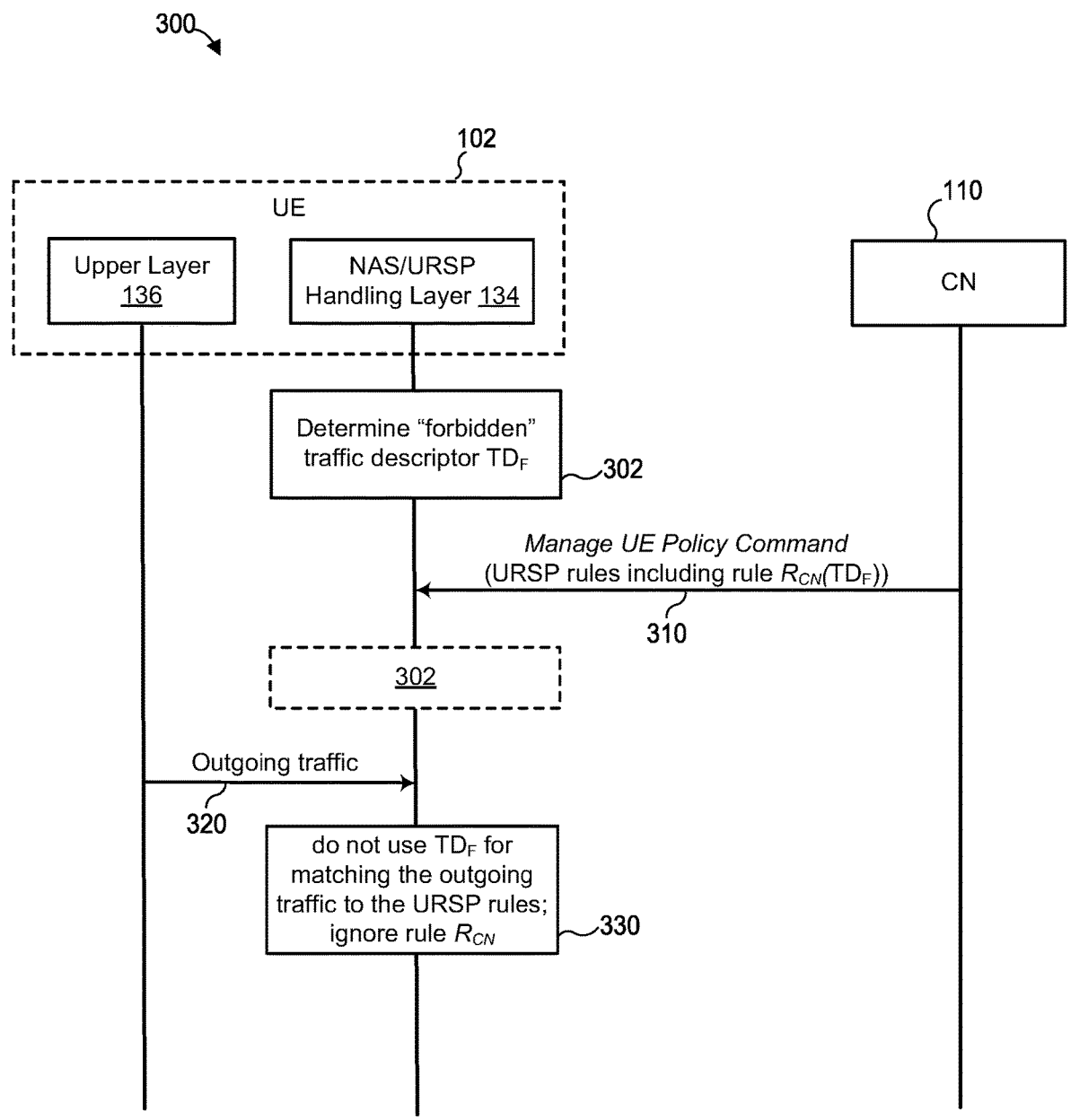
FIG. 3A is a messaging diagram of an example scenario in which the UE of FIG. 1 determines that a certain proscribed or "forbidden" traffic descriptor is not to be used at the UE for routing outgoing traffic, and ignores a rule received from a core network (CN) that references only the proscribed traffic descriptor.

FIG. 3A is a messaging diagram of an example scenario 300 in which the UE 102 of FIG. 1 determines that it should not apply a certain traffic descriptor for routing outgoing traffic at the UE 102, and ignores a rule received from the CN 110 that references only this proscribed (or "forbidden") traffic descriptor $TD_F$. For simplicity, this discussion refers to the forbidden traffic descriptor $TD_F$ in the singular. However, the UE 102 in general can identify any suitable number of forbidden descriptors.

The NAS/URSP handling layer 134 identifies or determines 302 the forbidden traffic descriptor $TD_F$. The forbidden traffic descriptor may correspond to a type of traffic descriptor (e.g., any traffic descriptor that is an application identifier), or to a particular parameter of a traffic descriptor (e.g., a particular application). The UE 102 may determine that a certain traffic descriptor is forbidden because the entity operating within the UE and executing the URSP rules, such as the NAS/URSP handling layer 134 or a connection manager of the UE 102, does not have access to the forbidden traffic descriptor or to the type of parameter of the outgoing traffic to which the traffic descriptor corresponds. In some cases, the OS 140 may inform the NAS/URSP handling layer 134 of the outgoing traffic parameters the UE 102 should not use when applying the URSP rules.

The UE 102 also may determine that certain traffic parameters are forbidden based on instructions stored on or received at the UE 102. Such instructions may originate for example from the manufacturer of the UE 102, a hardware component of the UE 102, a firmware or software component of the UE 102, the OS 140, etc. Although FIG. 3A depicts event 302 as occurring prior to event 310, in other implementations or scenarios event 302 can occur after event 310. In other words, the UE 102 may make the determination 302 after receiving 310 the URSP rules from the CN.

With continued reference to FIG. 3A, the UE 102 receives 310 a message including URSP rules from the CN 110. The message can be associated with a protocol for delivering a route selection policy. In this example, the message is a Manage UE Policy Command. The URSP rules in this scenario include a rule $R_{CN}$ with at least one forbidden traffic descriptor $TD_F$. In some implementations, all of the traffic descriptors of rule $R_{CN}$ may be forbidden. In general, the message of event 310 can include one or more rules with only one or several forbidden descriptors, one or more rules with only one or several permissible descriptors, and one or more rules with one or several forbidden descriptors as well as one or several permissible descriptors.

Next, the upper layer 136 provides 320 outgoing traffic to the NAS/URSP handling layer 134. In response, the NAS/URSP handling layer 134 applies 330 the URSP rules to the outgoing traffic, subject to the restriction that the UE 102 cannot match outgoing traffic to the traffic descriptor $TD_F$. More specifically, in this implementation, the NAS/URSP handling layer 134 prevents the application of $TD_F$ to the outgoing traffic by ignoring rule $R_{CN}$.

Figure 3B:
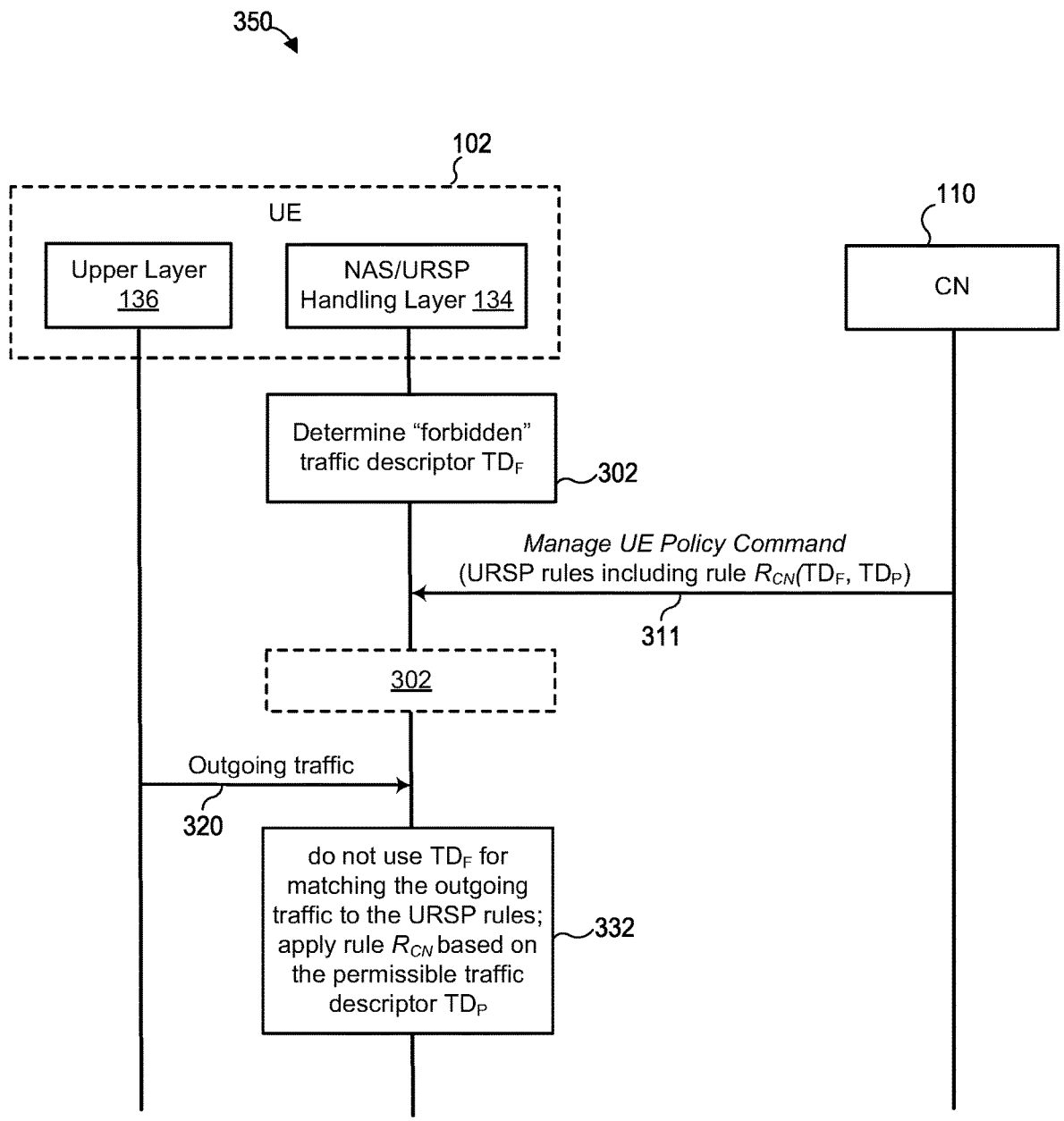
FIG. 3B is a messaging diagram of an example scenario in which the UE of FIG. 1 receives a rule that references a proscribed traffic descriptor as well as a permissible traffic descriptor, and applies the rule to the outgoing traffic using only the permissible traffic descriptor.

FIG. 3B is a messaging diagram of an example scenario 350 in which the UE 102 of FIG. 1 receives a rule that references a forbidden traffic descriptor as well as a permissible traffic descriptor, and applies the rule to the outgoing traffic using only the permissible traffic descriptor. As discussed above with reference to FIG. 3A, the UE 102 determines 302 forbidden traffic descriptor $TD_F$ prior to or after receiving the URSP rules from the CN 110. However, the UE 102 in this scenario receives 311 a message with URSP rules that include a rule $R_{CN}$ that includes both a forbidden traffic descriptor $TD_F$ and a permissible traffic descriptor $TD_P$, from the CN 110. After the UE 102 detects 320 outgoing traffic, the UE 102 does not use $TD_F$ for matching the outgoing traffic to the URSP rules. More particularly, the UE 102 ignores 332 $TD_F$ and uses only $TD_P$ for matching the outgoing traffic to $R_{CN}$. Thus, the UE 102 still applies $R_{CN}$ to the outgoing traffic, but does so based on the permissible traffic descriptor $TD_P$ rather than the forbidden traffic descriptor $TD_F$.

Figure 4A:
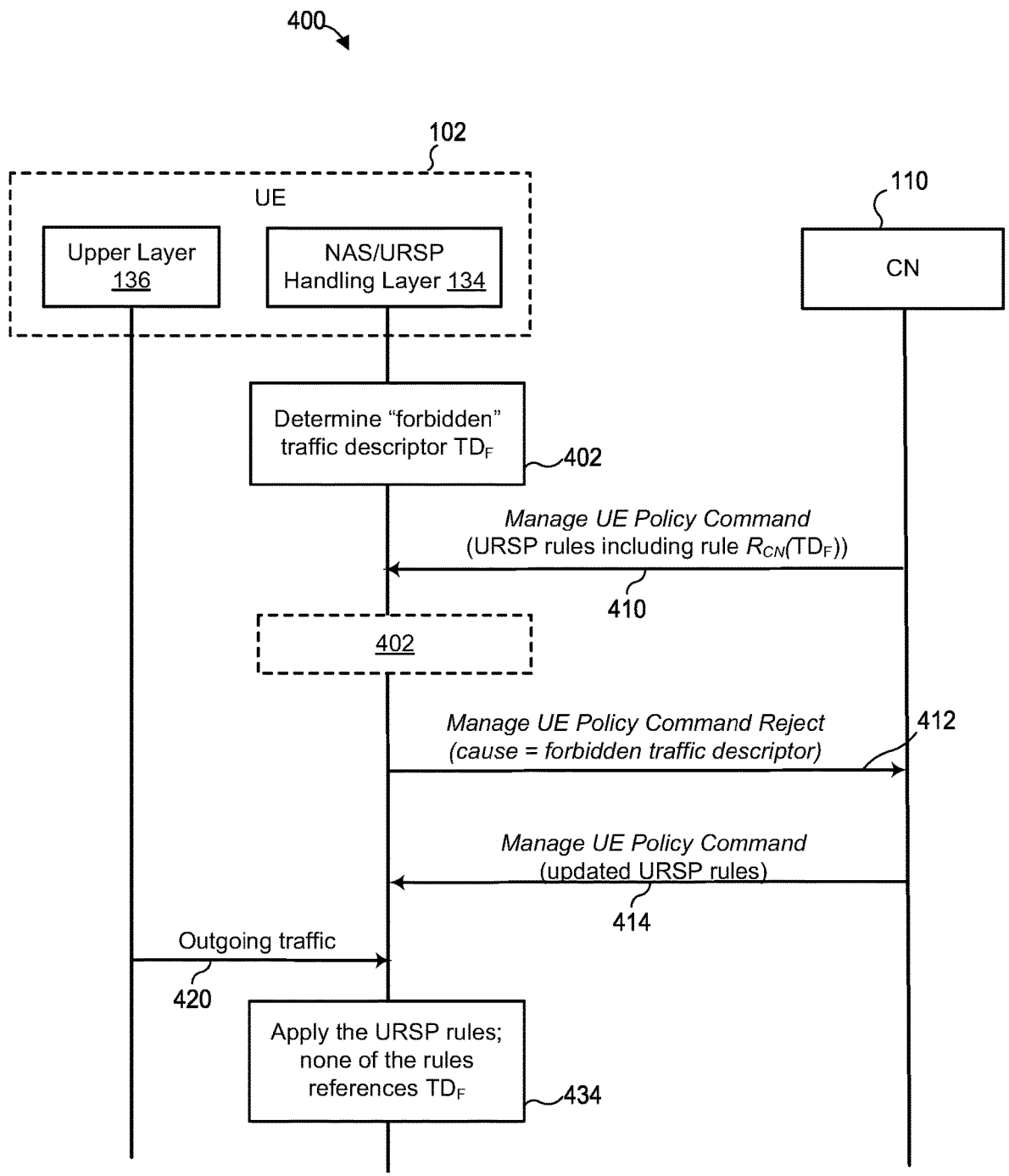
FIG. 4A is a messaging diagram of an example scenario in which the UE of FIG. 1 notifies the CN of a proscribed traffic descriptor using a message of a protocol for delivering a route selection policy.

Now referring to FIG. 4A, in an example scenario 400 the UE 102 notifies the CN 110 of a forbidden traffic descriptor using a message of a protocol for delivering a route selection policy. Events 402 and 410 are similar to events 302 and 310, respectively. In response to receiving a $R_{CN}(TD_F)$ including only a forbidden traffic descriptor (or several forbidden traffic descriptors), the UE 102 transmits 412 a message to the CN 110 notifying the CN 110 of the forbidden traffic descriptor $TD_F$. Alternatively, the message can identify rule $R_{CN}$. The UE 102 in this example includes 412 an indication of $TD_F$ and/or $R_{CN}$ in a cause information element (IE) of a Manage UE Policy Command Reject message.

In response to receiving 412 the Manage UE Policy Command Reject message, the CN 110 may modify the URSP rules and transmit 414 updated URSP rules to the UE 110 as another instance of the Manage UE Policy Command message for example. In some implementations, the CN 110 removes rule $R_{CN}$ from the URSP before transmitting 414 the updated URSP to the UE 102. Alternatively, the CN 110 may modify $R_{CN}$ by removing $TD_F$ but retaining one or more permissible traffic descriptors. The CN 110 similarly can remove or modify other URSP rules that reference the forbidden traffic descriptor. After the UE 102 receives 414 the updated URSP rules and detects 420 outgoing traffic, the UE 102 can apply 434 the received updated URSP rules, which no longer reference $TD_F$. In this manner, the UE 102 prevents the use of a traffic descriptor to application to URSP rules.

Figure 4B:
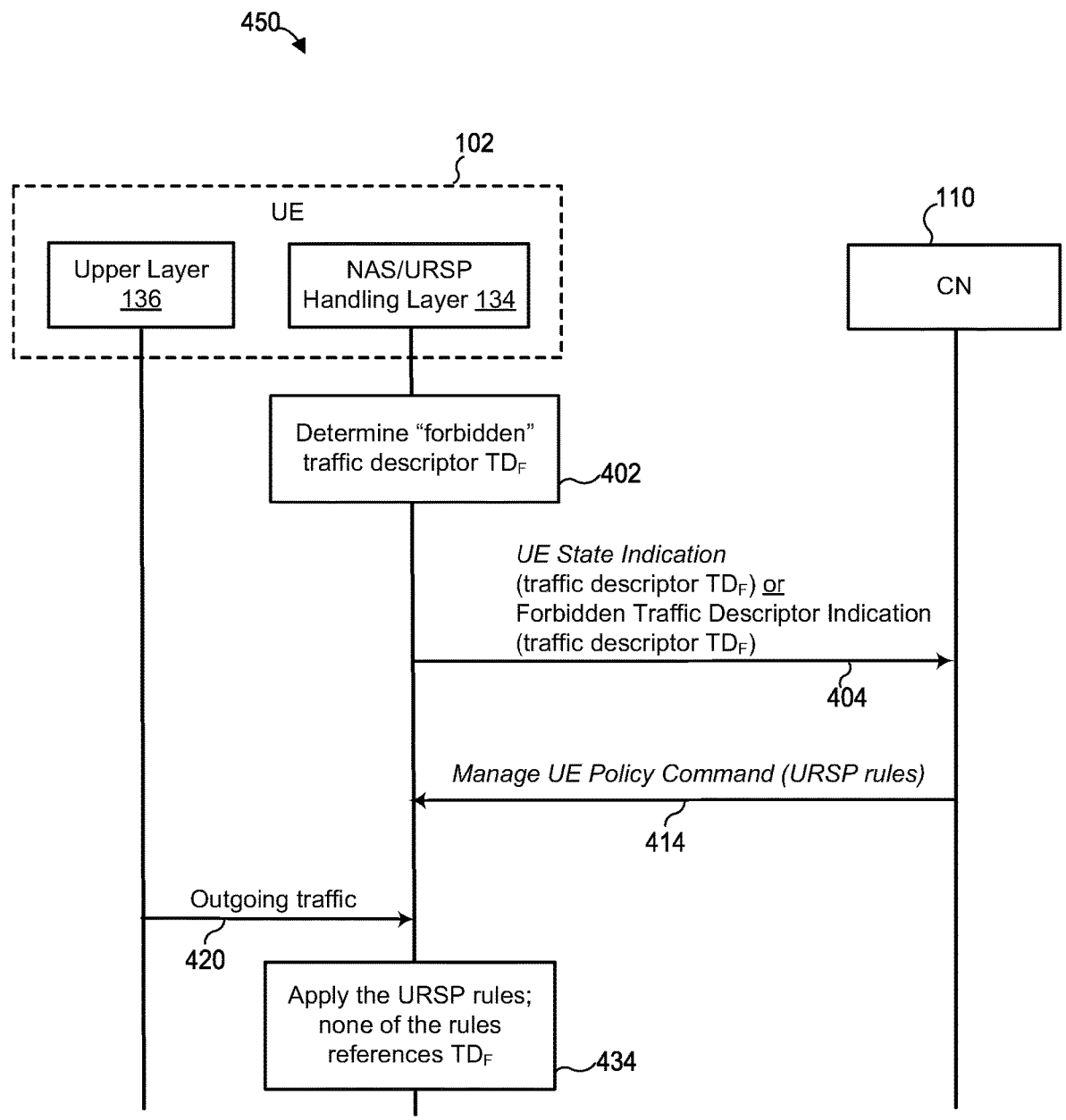
FIG. 4B is a messaging diagram of an example scenario in which the UE of FIG. 1 notifies the CN of a proscribed traffic descriptor using an indication of the UE state or a dedicated message for reporting proscribed traffic descriptors.

FIG. 4B is a messaging diagram of an example scenario 450 in which the UE 102 of FIG. 1 notifies the CN 110 of a forbidden traffic descriptor using an indication of the current state of the UE or a dedicated message defined specifically for reporting forbidden traffic descriptors. The UE 102 determines 402 a forbidden traffic descriptor $TD_F$ and transmits 404 a message indicating the forbidden traffic descriptor $TD_F$. The message may be for example a UE State Indication message with a field specifying the traffic descriptor $TD_F$. As a more particular example, the UE 102 can include traffic descriptor $TD_F$ in the Policy Classmark IE of the UE State Indication message. In other implementations, the message the UE 102 transmits 414 may be a of message defined specifically for reporting forbidden traffic descriptors.

In response to receiving 404 a message indicating the forbidden traffic descriptor $TD_F$, the CN 110 transmits 414 URSP rules to the UE 102 using a Manage UE Policy Command message or another suitable message. The UE 102 later detects 420 outgoing traffic and applies 434 the URSP rules to the detected outgoing traffic. Because the URSP rules do not reference $TD_F$ in view of event 404, the UE 102 has prevented the use of a traffic descriptor to application to URSP rules.

In some cases, the CN 110 may ignore or may not support the message or IE the UE 102 uses to specify the forbidden traffic descriptors, or the CN 110 may transmit an URSP policy with rules that reference $TD_F$ prior to receiving an indication that $TD_F$ is forbidden, effectively creating a race condition between events 404 and 414. The UE 102 in some implementations can apply the techniques discussed above with reference to FIGS. 3A-B or FIG. 5 discussed below in combination with the technique of FIG. 4A or FIG. 4B, so as to prevent application of a rule received from the CN 110 and referencing a forbidden traffic descriptor.

Figure 5:
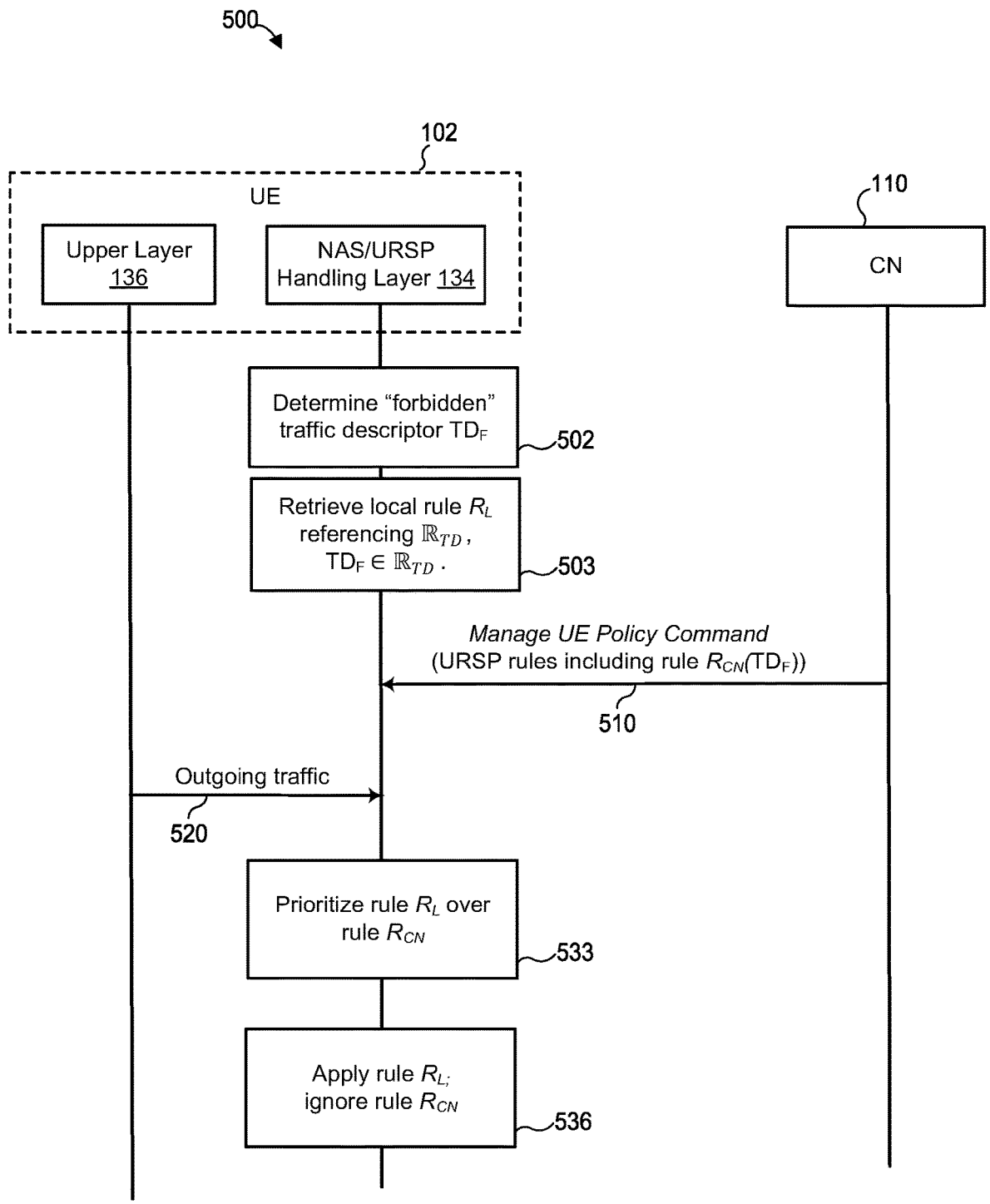
FIG. 5 is a messaging diagram of an example scenario in which the UE of FIG. 1 prioritizes a local rule that references a range of traffic descriptors that includes a proscribed traffic descriptor over a rule received from the CN that references the proscribed traffic descriptor.

FIG. 5 is a messaging diagram of an example scenario 500 in which the UE 102 of FIG. 1 prioritizes a local rule that references a range of traffic descriptors that includes a forbidden traffic descriptor over a rule received from the CN 110. As indicated above, URSP rules in general may originate at the UE 102 (e.g., from the manufacturer) or the PCF 124 of the CN 110. Local URSP rules, when available, can be stored in the memory 132 of the UE 102.

The UE 102 in this scenario determines 502 a forbidden descriptor $TD_F$, similar to events 302 and 402. The UE 102 also retrieves 503 a local rule $R_L$ that does not explicitly reference the forbidden traffic descriptor but applies to traffic that includes the forbidden traffic descriptor. For example, local rule $R_L$ may reference a range $\mathbb{R} \, T_D$ of traffic descriptors, where $TD_F$ belongs to range $\mathbb{R} \, T_D$ (i.e. $TD_F \in \mathbb{R} \, T_D$). In one scenario, $TD_F$ may correspond to a particular application identifier, whereas range $\mathbb{R}_{ID}$ may correspond to multiple application identifiers. The UE 102 then receives 510 from the CN 110 one or more URSP rules including a rule $R_{CN}$ ($TD_F$). In this implementation, the UE 102 receives a Manage UE Policy Command message, but in general can receive any suitable indication. Also, although events 502 and 503 occur prior to event 510 in this scenario, events 502 and 503 alternatively may occur after event 510.

After the UE 102 detects 520 outgoing traffic, the UE 102 determines which URSP rules the UE 102 should apply to the outgoing traffic. The UE 102 prioritizes 533 rule $R_L$ over rule $R_{CN}$ received from the CN 110. The UE 102 can prioritize $R_L$ by modifying the rule precedence field (see FIG. 2) of rule $R_L$ or rule $R_{CN}$ so that rule $R_L$ has a higher priority than rule $R_{CN}$. If the UE 102 raises the priority of rule $R_L$ relative to rule $R_{CN}$, the UE 102 applies 536 rule $R_L$ prior to applying rule $R_{CN}$, thereby masking out rule $R_{CN}$ when rule $R_{CN}$ references only one or more forbidden traffic descriptors. In other words, by applying 536 rule $R_L$ to the outgoing traffic, the UE 102 ignores rule $R_{CN}$. When $R_{CN}$ additionally references one or more other, permissible traffic descriptors, the UE 102 still applies rule $R_L$ prior to rule $R_{CN}$, but does not mask out the entirety of rule $R_{CN}$. The UE 102 still applies rule $R_{CN}$ based on the one or more permissible traffic descriptors.

Further, in some implementations, the UE 102 identifies and retrieves a local configuration including one or more local rules and prioritizes each of these local rules over all rules received from the CN 110. In other implementations, the UE 102 prioritizes local rules over only those rules received from the CN 110 that include a forbidden traffic descriptor.

In some cases, the techniques discussed with reference to FIGS. 3A-3B and FIG. 5 can be combined. For example, the UE 102 may receive from the CN 110 a set of URSP rules including rule $R_A(TD_F, TD_P)$, with both a forbidden traffic descriptor $TD_F$ and a permissible traffic descriptor $TD_P$, as well as rule $R_B(TD_F)$, which includes only a forbidden traffic descriptor. The UE 102 may apply rule $R_A$ in the manner discussed with reference to FIG. 3B, i.e., by applying $R_A$ based on permissible traffic descriptor $TD_P$ and not using forbidden traffic descriptor $TD_F$. Instead of applying $R_B$, the UE 102 may ignore $R_B$, as in FIG. 3A, or may prioritize a local rule $R_L$ over rule $R_B$ so that the UE 102 applies $R_L$ before applying rule $R_B$, as occurs in the scenario of FIG. 5.

Generally speaking, the techniques discussed above with reference to FIGS. 3A-5 can provide different advantages. For example, by preventively notifying the CN 110 of one or more forbidden traffic descriptors as illustrated in FIGS. 4A and 4B, the UE 102 in some implementations can reduce the size of a rule policy (e.g., URSP) the CN 110 provides to the UE 102 as well as simplify rule processing at the UE 102. On the other hand, the techniques of FIGS. 3A, 3B, and 5 do not require that the UE 102 and the CN 110 exchange a message 404 or 412, and thus reduce the amount of messaging during configuration. The UE 102 and/or the CN 110 can selectively apply these techniques in view of network conditions, for example.

Figure 6:
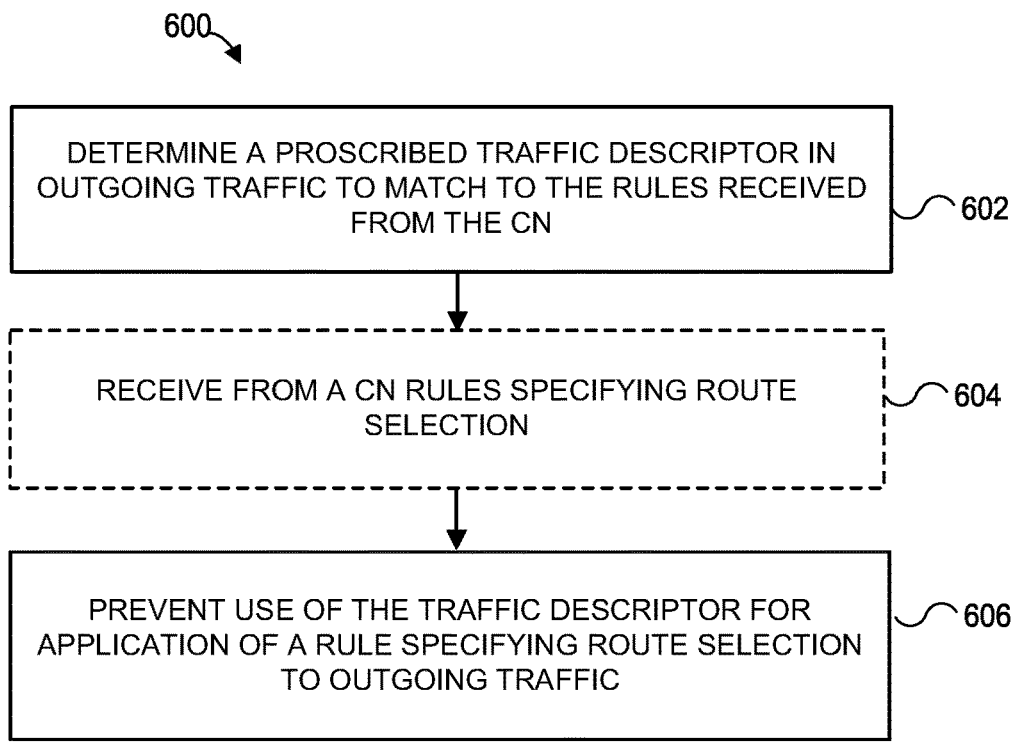
FIG. 6 is a flow diagram of an example method for routing outgoing traffic, which can be implemented in the UE of FIG. 1.

For further clarity, FIG. 6 illustrates a flow diagram of an example method 600 for routing outgoing traffic, which can be implemented in the UE 102 of FIG. 1. The method 600 begins at block 602, where the UE 102 determines a proscribed or forbidden traffic descriptor in outgoing traffic which the UE 102 is to match to the rules received from the CN 102 (see, e.g., events 302 in FIGS. 3A and 3B, event 402 in FIGS. 4A and 4B, or event 502 in FIG. 5).

The method 600 in at least some of the implementations includes block 604, where the UE 102 receives from the CN 110 one or more rules specifying route selection for outgoing traffic (see, e.g., event 310 in FIG. 3A, event 311 in FIG. 3B, event 410 in FIG. 4A, event 414 in FIG. 4B, or event 510 in FIG. 5). The UE 102 can execute blocks 602 and 604 in either order.

At block 606, the UE 102 prevents the use of the proscribed traffic descriptor for application of one or more rules to outgoing traffic. To this end, the UE 102 can receive URSP rules from the CN 110 and ignore URSP rules that include a forbidden traffic descriptor (see, e.g., event 330 in FIG. 3A). Additionally or alternatively, the UE 102 can apply a received URSP rule based only on the permissible traffic descriptor(s) the rule includes (see, e.g., event 332 in FIG. 3B). Additionally or alternatively, the UE 102 can request that the CN 110 modify the policy in view of a forbidden traffic descriptor and receive a set of updated rules (see, e.g., events 412 and 414 in FIG. 4A) or preempt transmission of rules referencing a forbidden traffic descriptor from the CN 110 (see, e.g., event 404 in FIG. 4B). Additionally or alternatively, the UE 102 can prioritize a local configuration or local rule over a rule received from the CN 110 (see, e.g., event 533 in FIG. 5).

Figure 7:
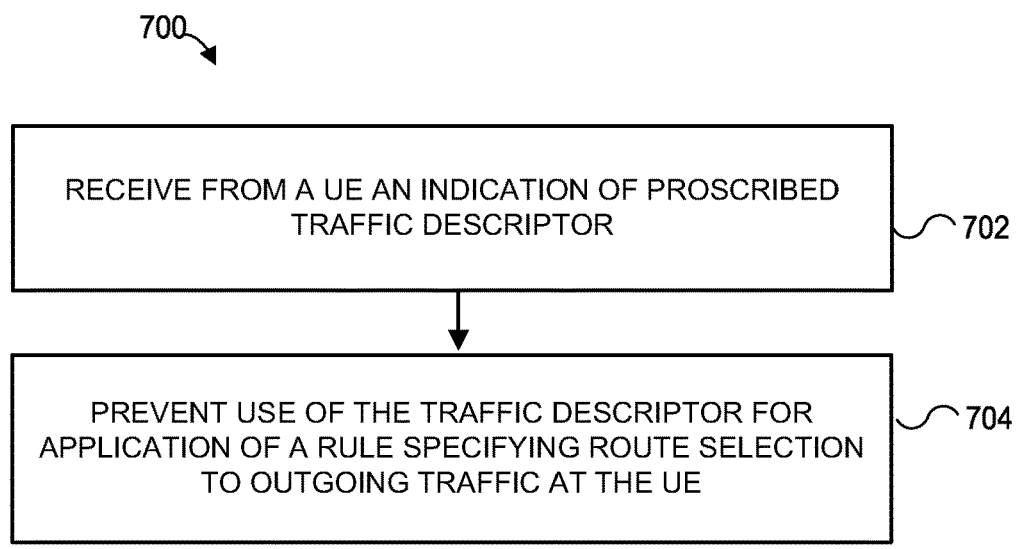
FIG. 7 is a flow diagram of an example method for facilitating the routing of outgoing traffic at a UE, which can be implemented in the core network of FIG. 1.

FIG. 7 is a flow diagram of an example method 700 for facilitating the outgoing traffic at a UE, which can be implemented in the CN 110 of FIG. 1. The method 700 begins at step 702, where the CN receives from a UE 102 an indication of a proscribed traffic descriptor which the UE 102 matches to rules that specify route selection for outgoing traffic (see, e.g., event 412 in FIG. 4A or event 404 in FIG. 4B). In general, the CN 110 can receive a message that conforms to a protocol for providing a routing policy to the UE 102, a message that indicates the current state of the UE 102, or a dedicated message defined specifically for the purpose of indicating forbidden traffic descriptors to the CN 110.

At block 704, the CN 110 prevents the use of the traffic descriptor for application of a rule specifying route selection to outgoing traffic at the UE 102. The CN 110 may prevent the use of the traffic descriptor by modifying one or more URSP rules for the UE 102 to remove the forbidden traffic descriptor (see, e.g., event 414 in FIG. 4A or FIG. 4B). As discussed above, the CN 110 can remove from the URSP all rules that reference the forbidden traffic descriptor prior to transmitting the rules to the UE 102, and/or the CN 110 can modify one or more rules that reference the forbidden traffic descriptor by removing the forbidden traffic descriptor or replacing the forbidden traffic descriptor with a permissible traffic descriptor.

By way of example, and not limitation, the disclosure herein contemplates at least the following aspects:

Aspect 1. A method of routing outgoing traffic in a user equipment (UE) that communicates with a core network (CN) via a radio access network (RAN), the method comprising: determining, by processing hardware, a proscribed traffic descriptor to be excluded from application of rules defined by the CN that specify route selection for outgoing traffic at the UE; and preventing, by the processing hardware, use of the proscribed traffic descriptor for application of a rule of a set of rules specifying route selection to the outgoing traffic.

Aspect 2. The method of aspect 1, wherein the rule is a first rule, and wherein preventing the application of the first rule includes: receiving, by the processing hardware, the first rule from the core network; and preventing the application of the first rule at the UE.

Aspect 3. The method of aspect 2, wherein preventing the application of the first rule further includes: ignoring the first rule in response to determining that the first rule references the proscribed traffic descriptor and does not reference any other traffic descriptors.

Aspect 4. The method of aspect 2 or 3, further comprising preventing use of the proscribed traffic descriptor for application of a second rule, wherein: the proscribed traffic descriptor is a first traffic descriptor; and preventing the application of the second rule includes: determining that the second rule references the first traffic descriptor and a second traffic descriptor; and applying the second rule to the outgoing traffic based on the second traffic descriptor and without using the first traffic descriptor.

Aspect 5. The method of aspect 2, wherein preventing the application of the first rule at the UE is in response to determining, by the processing hardware, that a memory of the UE stores a local configuration referencing a range that includes the proscribed traffic descriptor.

Aspect 6. The method of aspect 5, wherein preventing the application of the first rule includes assigning a higher priority to the local configuration than to the first rule received from the core network.

Aspect 7. The method of aspect 1, wherein preventing the application of the rule includes: sending, by the processing hardware, an indication of the proscribed traffic descriptor to the CN, wherein the CN, in response to the indication, excludes the rule from the set of rules sent to the UE, or modifies the rule to remove the proscribed traffic descriptor prior to sending the rule to the UE.

Aspect 8. The method of aspect 7, wherein sending the indication to the CN includes sending a message that conforms to a protocol for delivering a route selection policy between the CN and the UE, the message indicating that the UE has rejected the rule.

Aspect 9. The method of aspect 8, wherein the message includes an information element (IE) that specifies a cause for rejecting the rule at the UE.

Aspect 10. The method of aspect 7, wherein sending the indication to the CN includes sending a message that indicates a current state of the UE.

Aspect 11. The method of aspect 10, wherein the message includes an IE that specifies the proscribed traffic descriptor.

Aspect 12. The method of aspect 1, wherein determining the proscribed traffic descriptor includes determining that an entity operating within the UE and applying rules that specify route selection cannot access a type of parameter of the outgoing traffic to which the proscribed traffic descriptor corresponds.

Aspect 13. The method of any of the preceding aspects, wherein the rule includes a rule precedence to specify precedence of the rule relative to other rules that specify route selection, at the UE.

Aspect 14. The method of any of the preceding aspects, wherein the rule includes a route selection descriptor that indicates whether outgoing traffic to which the rule applies should be (i) offloaded to a wireless local area network, (ii) routed to an existing Protocol Data Unit (PDU) session, or (iii) routed to a new PDU session.

Aspect 15. The method any of the preceding aspects, wherein the proscribed traffic descriptor refers to one or more of: (i) an identifier of an application executing on an operating system (OS) of the UE, (ii) an Internet Protocol (IP) destination; (iii) a type of network traffic, (iv) a data network name (DNN), (v) connection capabilities of the UE, or (vi) a domain descriptor.

Aspect 16. The method of any of the preceding aspects, wherein the rule conforms to a UE Route Selection Policy (URSP) format.

Aspect 17. A user equipment (UE) comprising processing hardware and configured to execute a method according to any of the preceding aspects.

Aspect 18. A method in a core network (CN) for facilitating routing of outgoing traffic at a user equipment (UE), the method comprising: receiving, by processing hardware, an indication of a proscribed traffic descriptor to be excluded from application of rules defined by the CN that specify route selection for outgoing traffic at the UE; and preventing, by the processing hardware, use of the proscribed traffic descriptor for application of a rule of a set of rules specifying route selection to the outgoing traffic at the UE.

Aspect 19. The method of aspect 18, wherein receiving the indication includes receiving a message that conforms to a protocol for delivering a route selection policy between the CN and the UE, the message indicating that the UE has rejected the rule.

Aspect 20. The method of aspect 19, wherein the message includes an information element (IE) that specifies a cause for rejecting the rule at the UE.

Aspect 21. The method of aspect 18, wherein the indication to the CN includes receiving a message that indicates a current state of the UE.

Aspect 22. The method of aspect 21, wherein the message includes an IE that specifies the proscribed traffic descriptor.

Aspect 23. The method of aspect 18, wherein the rule is a first rule, and wherein the preventing includes not sending the first rule to the UE, wherein the first rule references the proscribed traffic descriptor and does not reference any other traffic descriptors.

Aspect 24. The method of aspect 18 or 23, wherein: a second rule of the set of rules references the proscribed traffic descriptor and at least one other traffic descriptor; and the preventing includes preventing use of the proscribed traffic descriptor for application of the second rule by: modifying the second rule so that the second rule does not reference the proscribed traffic descriptor, and sending the modified second rule to the UE.

Aspect 25. The method of any of aspects 18-24, wherein the rule conforms to a UE Route Selection Policy (URSP) format.

Aspect 26. A system comprising processing hardware and configured to execute a method according to any of aspects 18-25.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method of routing outgoing traffic of a user equipment (UE) that communicates with a core network (CN) via a radio access network (RAN), the method comprising:
   determining, by the UE, a first traffic descriptor to be excluded from application of rules that specify route selection for the outgoing traffic;
   receiving, from the CN, a set of rules specifying the route selection including:
   a first rule referencing the first traffic descriptor and not referencing a second traffic descriptor, and
   a second rule referencing the first traffic descriptor and the second traffic descriptor; and
   preventing, by the UE, use of the first traffic descriptor for application of the first rule and the second rule.

2. The method of claim 1, wherein preventing the application of the first rule includes:
   ignoring the first rule.

3. The method of claim 1, further comprising: applying the second rule to the outgoing traffic based on the second traffic descriptor and without using the first traffic descriptor.

4. The method of claim 1, further comprising: preventing the application of a third rule of the set of rules, the third rule referencing the first traffic descriptor, in response to determining that a memory of the UE stores a local configuration referencing a range that includes the first traffic descriptor.

5. The method of claim 4, wherein preventing the application of the third rule includes:
   assigning a higher priority to the local configuration than to the third rule.

6. The method of claim 1, wherein determining the first traffic descriptor includes determining that an entity operating within the UE and applying rules that specify the route selection is without access to a type of parameter of the outgoing traffic to which the first traffic descriptor corresponds.

7. The method of claim 1, wherein the first rule conforms to a UE Route Selection Policy (URSP) format.

8. The method of claim 1, wherein the first traffic descriptor is a proscribed traffic descriptor, and wherein the second traffic descriptor is a non-proscribed traffic descriptor.

9. The method of claim 1, wherein the second traffic descriptor refers to a connection capability of the UE.

10. The method of claim 1, wherein the second traffic descriptor is a match all traffic descriptor that applies to any outgoing traffic.

11. A user equipment (UE) for routing outgoing traffic from the UE, the UE communicating with a core network (CN) via a radio access network (RAN), and the UE comprising processing hardware and configured to:
    determine a first traffic descriptor to be excluded from application of rules that specify route selection for the outgoing traffic;
    receive a set of rules specifying the route selection including:
    a first rule referencing the first traffic descriptor and not referencing a second traffic descriptor, and
    a second rule referencing the first traffic descriptor and the second traffic descriptor; and
    prevent use of the first traffic descriptor for application of the first rule and the second rule.

12. The UE of claim 11, wherein the UE is further configured to: apply the second rule to the outgoing traffic based on the second traffic descriptor and without using the first traffic descriptor.

13. The UE of claim 11, wherein the UE is further configured to:
    prevent the application of a third rule of the set of rules, the third rule referencing the first traffic descriptor, in response to determining that a memory of the UE stores a local configuration referencing a range that includes the first traffic descriptor.

14. The UE of claim 13, wherein, to prevent application of the third rule, the UE is configured to:
    assign a higher priority to the local configuration than to the third rule.

15. The UE of claim 11, wherein, to determine the first traffic descriptor, the UE is configured to:
    determine that an entity operating within the UE and applying the rules that specify the route selection is without access to a type of parameter of the outgoing traffic to which the first traffic descriptor corresponds.

16. A method of a core network (CN) for facilitating routing of outgoing traffic of a user equipment (UE), the method comprising:
    receiving, from the UE, an indication of a proscribed traffic descriptor to be excluded from application of rules that specify route selection for the outgoing traffic of the UE; and
    sending, to the UE, a set of rules that prevents use of the proscribed traffic descriptor for application of a first rule of the set of rules specifying the route selection, the first rule referencing the proscribed traffic descriptor and not referencing a non-proscribed traffic descriptor.

17. The method of claim 16, wherein receiving the indication includes receiving a message that at least one of:
    conforms to a protocol for delivering a route selection policy between the CN and the UE, the message indicating that the UE has rejected the set of rules; or
    indicates a current state of the UE, wherein the message includes an information element (IE) that specifies at least one of: a cause for rejecting the set of rules at the UE, or the proscribed traffic descriptor.

18. The method of claim 16, further comprising:
modifying a second rule to prevent the second rule does not reference the proscribed traffic descriptor, and
sending the modified second rule to the UE.

19. The method of claim 16, wherein the second traffic descriptor refers to a connection capability of the UE.

20. The method of claim 16, wherein the second traffic descriptor includes a match all traffic descriptor that applies to any outgoing traffic.

\* \* \* \* \*